Jan. 19, 1960

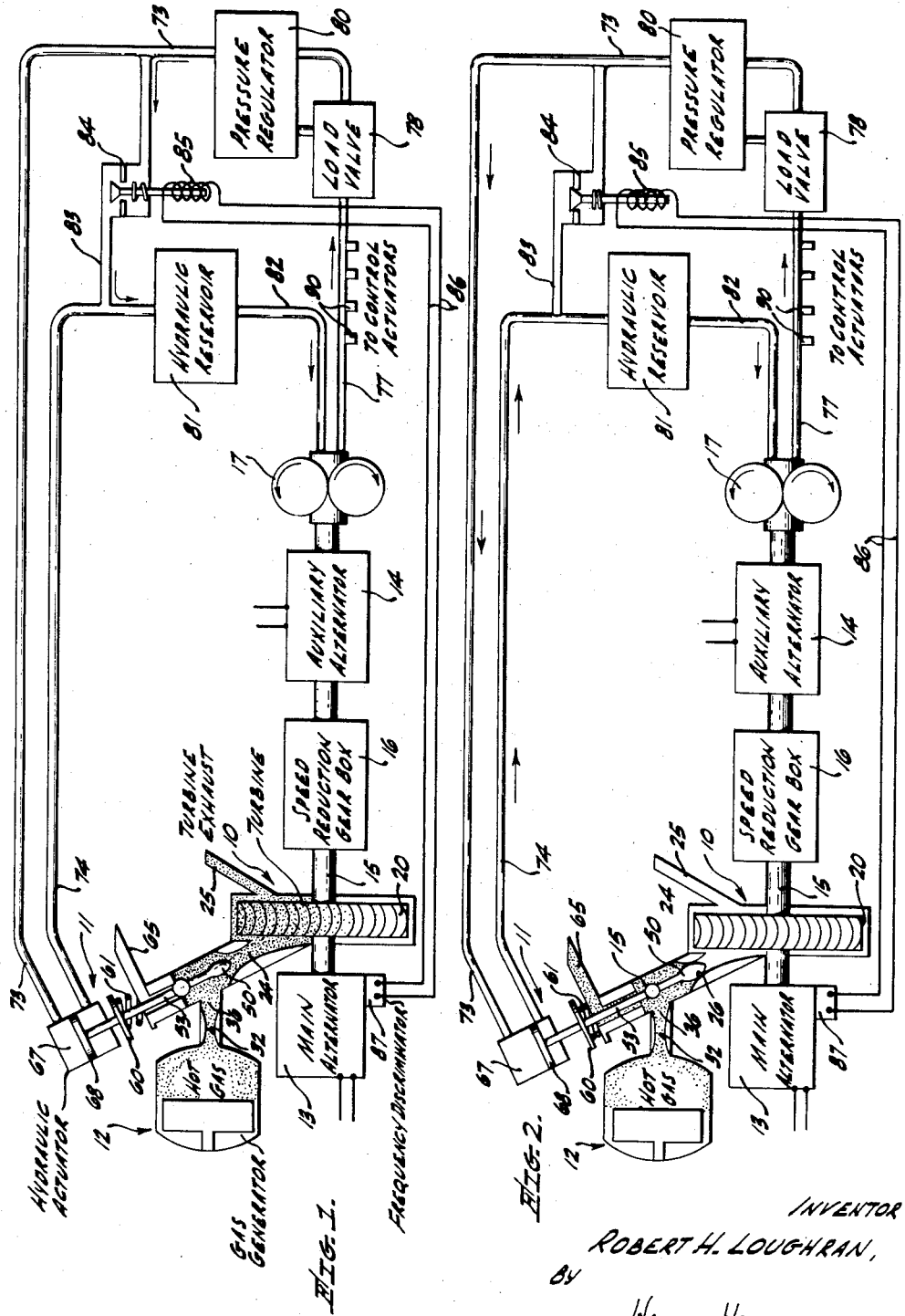

R. H. LOUGHRAN 2,922,050

TURBINE CONTROL MECHANISM

Filed Nov. 9, 1955

INVENTOR
ROBERT H. LOUGHRAN,
BY
Henry Hyman
ATTORNEY.

United States Patent Office 2,922,050
Patented Jan. 19, 1960

2,922,050

TURBINE CONTROL MECHANISM

Robert H. Loughran, Los Angeles, Calif., assignor to Hughes Aircraft Company, Culver City, Calif., a corporation of Delaware Application November 9, 1955, Serial No. 546,063

4 Claims. (Cl. 290—40)

The present invention relates generally to controls and relates more specifically to speed control mechanisms for power turbines or the like. More particularly, the present invention finds primary utility in association with delivery and control of hot gases, resulting from reaction of a propellant, to a reaction type motor.

In the control of power turbines, serious problems have existed in connection with time lags in modulating controls upon instigation of large step increases and decreases in load on the turbine. In power turbine mechanisms utilized to drive relatively constant speed apparatus such as alternators, for example, the delivery of hot gases to the turbine rotor must necessarily be controlled in response to and in accordance wtih loading on the turbine. In the event of changed torque output requirements, controls must function with sufficient rapidity as to prevent undesirable speedup or slowdown in the rotational speed of the turbine. Solid or liquid propellants utilized to drive turbines and the like must necessarily be located with a duct arrangement extended between the propellant and the turbine rotor, physical volume of these ducts, and the position of controls therein, being extremely important in preventing the undesirable speed changes of the turbine.

In accordance with the invention it has been found that the provision of a pair of nozzles in series with a minimum of volume between such nozzles and a control mechanism within this area will result in the aforementioned desired concise speed control of the turbine, such control mechanism being operable in response to changes in output speed of a turbine rotor shaft.

It is, accordingly, one object of the present invention to provide a novel turbine speed control mechanism.

It is another important object of the present invention to provide a novel turbine control mechanism including a pair of serially arranged nozzle type orifices and a propellant flow control mechanism disposed between such orifices.

It is another important object of the present invention to provide a novel turbine control mechanism having a pair of serially arranged nozzles and novel support and insulating means for such nozzles, to compensate for thermal expansion, heat absorption and radiation.

It is still another important object of the present invention to provide a novel control mechanism for a turbine that is rapid in response, accurate and effective in use and reliable in operation.

Still another object of the present invention is to provide a novel turbine control arrangement that is adapted for disposition in relatively small spaces and which is sufficiently rugged as to withstand required uses.

Other and further important objects of the present invention will become apparent from the disclosures in the following detailed specification, appended claims and accompanying drawings, wherein:

Figure 1 is a schematic diagram showing the present turbine control mechanism disposed in a typical control system;

Fig. 2 is a schematic diagram similar to Fig. 1 with parts in different positions.

Figure 3:
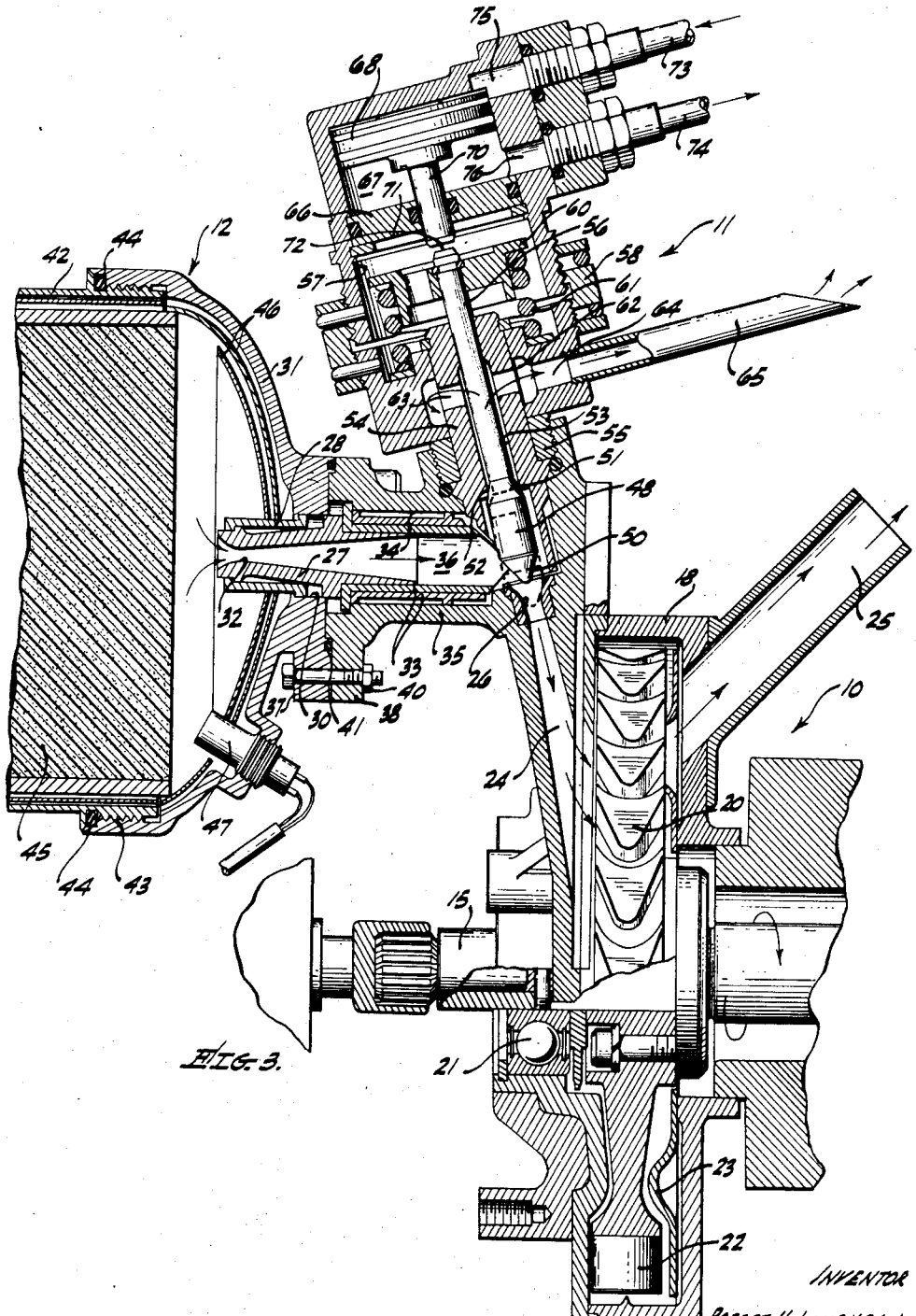
Fig. 3 is an enlarged sectional view showing details of the present turbine control mechanism associated with a propellant source and power turbine unit.

With reference to the drawings, the mechanism of the present invention includes generally a power turbine 10; a control mechanism 11 for the turbine; and a source of propellant gas indicated generally at 12. With reference to Fig. 1, it is to be noted that the turbine 10 is adapted to drive a main alternator 13 and an auxiliary alternator 14 by way of a shaft 15, there being a speed reduction gear box 16 positioned between the turbine 10 and the auxiliary alternator 14. Additionally, the shaft 15 also serves to drive a suitable hydraulic pump 17 which provides hydraulic pressure for operation of the turbine control mechanism 11.

With reference primarily to Fig. 3, the turbine 10 includes a housing 18 in which a turbine rotor 20 is positioned. The turbine rotor 20 is mounted on the shaft 15 and journalled in suitable bearings 21 that are, in turn, positioned within the housing 18. The rotor 20 has peripheral bucket shaped blades 22, there being suitable heat shielding 23 about various portions of the rotor. Motive fluid is transmitted to the turbine 10 by way of an inlet gas expansion passage 24. The exhaust gases from the turbine are conducted outwardly therefrom by way of an exhaust gas passage 25.

The inlet passage 24 is in the form of and is considered a second or downstream nozzle, one end of which is provided with a reduced diameter throat 26. Motive fluid is conducted from the gas generator 12 through a first or upstream nozzle member 27, that is carried by a sleeve 28 retained in an exit opening 30 in one end of a housing 31 of the gas generator. The nozzle member 27 is provided with a reduced diameter throat 32 and is surrounded by heat insulating shields 33 that are positioned within a bore 34 in an extending portion 35 of the turbine housing 18. Thus, there is a relatively small volume passageway 36 defined between the throats 32 and 26 for a purpose to be hereinafter more fully described.

The gas generator 12 has a flanged portion 37, on one end of the housing 31, that is mated with a flanged portion 38 formed on one end of the housing portion 35. The flanges 37 and 38 are secured together by means of nuts and bolts 40, there being a suitable seal 41 positioned therebetween. The gas generator 12 further includes a rearward portion 42 that is threadably secured to the portion 31 as at 43, there being an annular sealing member 44 positioned therebetween. The generator 12 is adapted for retention of a suitable propellant 45, with the interior of housing portion 31 having disposed therein a plurality of heat shields 46. An ignitor 47 extends through the wall of the housing portion 31 and into the interior of the gas generator for initiating action of the propellant 45.

As further shown in Fig. 3, the control 11 for the turbine 10 includes a valve member 48 positioned in the passageway 36. The valve member 48 includes a valve portion 50 cooperable with the nozzle throat 26 and a valve portion 51 that is cooperable with a valve seat 52 formed on one end of a passageway 53 that is coextensive with the inlet nozzle 24 and formed within an insert 54. The insert 54 engages the housing 18 and is retained therein by means of a threaded locking member 55. The valve member 48 is provided with a shaft 56 that is slidably journalled in the insert 54. The shaft 56 has a free end thereof positioned within a chamber 57 of a control housing assembly 58. The free end of the shaft 56 is provided with a retainer 60, there being a compression spring 61 positioned between the retainer and an end wall with chamber 57, thus to bias the valve member 48 in a direction whereby the portion 51 thereof will be in engagement with the valve seat 52.

The housing assembly 58 of the control 11 includes an annular chamber 62, there being a plurality of laterally disposed openings 63 in the insert 54 which provide communication between the bore 53 and the chamber 62. A lateral passageway 64 in the control housing assembly 58 provides communication between the chamber 62 and an exhaust conduit 65, the purpose of this particular construction to be hereinafter more fully described.

With further reference to control mechanism 11, one end of the chamber 57 is closed by means of a partition 66 which also defines one side of a control pressure chamber 67. An actuating piston 68 is slidably positioned, forms a movable wall within the control pressure chamber 67 and has a stub shaft 70 depended therefrom. The shaft 70 is slidably disposed in an axial opening 71 in the partition 66. The outer free end of the shaft 70 is adapted for cooperation with an end 72 of the valve member shaft 56. A pair of conduits 73 and 74 are attached to the housing assembly 78 and communicate with passageways 75 and 76 which extend to the chamber 67 on opposite sides of the piston 68. Thus, when pressure is transmitted through the conduit 73, the piston 68 will move in a direction whereby the stub shaft 70 will engage the end portion 72 of the shaft 56, to move the shaft 56 and the valve member 48 in a direction to compress the spring 61 and to move the valve member portion 50 in a direction tending to reduce fluid flow through or occlude the throat 26 associated with the inlet passageway nozzle 24.

With reference again to Fig. 1, the hydraulic pump 17 is adapted to deliver hydraulic fluid under pressure through a conduit 77 to a load valve 78 and a pressure regulator 80. Discharge from the pressure regulator is conducted through the conduit 73 to the chamber 67 of the turbine control mechanism 11. The conduit 74, from the turbine control mechanism 11, extends to a hydraulic reservoir 81 and thereafter, by way of a conduit 82, to the pump 17. A bypass conduit 83 is positioned between the conduits 73 and 74, there being a normally open solenoid operated valve 84 positioned in this bypass conduit. Thus, high pressure fluid from the pump 17 is circulated by way of the conduit 77, load valve 78, pressure regulator 80, bypass conduit 83, conduit 74, hydraulic reservoir 81 and conduit 82, with the hydraulic force available at the control mechanism 11 being insufficient to override the force of the compression spring 61. Thus, the valve member portions 50 and 51 will be in the position shown in Fig. 1, with hot gases from the generator 12 being delivered directly to the turbine blades 22 and exhausted outwardly through the exhaust conduit 25. It is to be noted that the solenoid valve 84 has a winding 85 that is connected, by way of leads 86, to a frequency discriminator 87 arranged in operative association with the main alternator 13. When the alternator 13 is operating at a speed below the designed output frequency, the winding 85 will remain deenergized, whereby to permit the valve 84 to remain in an open position, to bypass fluid through the bypass conduit 83. As the alternator 13 tends to be operated at a speed above the designed output frequency thereof, the valve 84 will be closed, as shown in Fig. 2, whereby tending to increase the pressure of the fluid in the conduit 73, move the piston 68, compress the springs 61 and move the valve member 50 in a direction to close the throat 26. Hot exhaust gases are thereafter conducted by way of the passageway 36, bore 55, lateral opening 63, chamber 62, passageway 64 and discharge conduit 65 to atmosphere.

It is specifically to be noted that the passageway 36 between the nozzles defined by the throats 32 and 26 is small. Accordingly, any large step increase or decrease in the load upon the turbine 10 will immediately be corrected by action of the control mechanism 11, inasmuch as there is a very low propulsive gas volume which undergoes a change in pressure level during such large step increase or decrease. The speed regulation of the turbine 10 is thereby maintained at a precise level in response to a specific frequency output of the main alternator 13. In other words, the time required for motive fluid pressure to the turbine inlet nozzle 26 to rise is very small after the valve member portion 51 is closed.

It is further to be noted that the existence of the pair of nozzles 32 and 26 in the particular arrangement set forth herein serve a further function of maintaining at all times a constant pressure head upstream of the nozzle 32, to maintain a condition wherein full pressure is immediately available for delivery to the turbine when such is desired. This condition exists regardless of the turbine requirements, inasmuch as the particular throat area of the nozzle 32, as adequately shown in Fig. 3, insures sonic velocity flow therethrough when back pressuring thereon is reduced. In other words, when the present apparatus is operating as shown in Fig. 1, the discharge from the gas generator is conducted through both of the nozzles 32 and 26 to the turbine and the existence of this turbine creates a back pressure on the propulsion products supply system, thereby reducing the requirements of flow through the nozzle 32 to such an extent as to permit flow therethrough to be in a subsonic range. Limiting flow control is, however, obtained by means of the nozzle 26 and the sonic flow characteristics thereof. When the valve 15 is moved from its seat, unrestricted exhaust flow of surplus gases is permitted by way of the discharge conduit 65, thereby permitting flow through the nozzle 36 to attain sonic velocity, thus to limit such flow while still maintaining a condition wherein full pressure is available should such be necessary for delivery to the turbine.

It is to be noted that the discharge conduit 77 from the hydraulic pump 17 has branch conduits 90 which extend to various control actuators, with loading upon the actuators creating additional power requirements from the pump 17, this loading being transmitted, by way of the shaft 15, to the turbine 10. Additionally, the main alternator 13 and the auxiliary alternator 14, when being utilized for supplying energy for the operation of suitable electronic circuits, may be required to produce a steady flow of energy or have variable output requirements, additionally to create variable load factors on the shaft 15 and turbine 10, thus necessitating a control operable within precise limits and as provided by the present mechanism.

Having thus described the invention and the present embodiment thereof, it is desired to emphasize the fact that many modifications may be resorted to in a manner limited only by a just interpretation of the following claims.

What is claimed is:

1. A turbine motor control system comprising: a power turbine; a source of propulsive fluid; first passage means for conducting reaction products from said propulsive fluid to a rotor of said power turbine; a pair of serially arranged flow restricting nozzles in said passage means, said nozzles being closely spaced with a relatively small volume area therebetween; a flow control valve positioned in said area and operatively associated with the furthest downstream of said nozzles; an atmospheric bleed conduit connected with said area, said valve being adapted also for cooperation with said bleed conduit; an alternator driven by said power turbine; a frequency discriminator operatively associated with said alternator; a fluid pump driven by said power turbine; a control mechanism operable in response to fluid pressure delivered by said pump and cooperable with said valve; a bypass conduit about said control mechanism; and a normally open solenoid operated valve in said bypass conduit, said solenoid valve being connected to and responsive to a specific output frequency of said frequency discriminator, whereby to effect positioning of said control mechanism and associated delivery of reaction products either to said turbine or to atmosphere.

2. A turbine motor control system comprising: a power turbine; a source of propulsive fluid; first passage means for conducting reaction products from said propulsive fluid to a rotor of said power turbine; a pair of serially arranged flow restricting nozzles in said passage means, said nozzles being closely spaced with a relatively small volume area therebetween; a flow control valve positioned in said area and operatively associated with the furthest downstream of said nozzles; an atmospheric bleed conduit connected with said area, said valve being adapted also for cooperation with said bleed conduit; means for biasing said valve toward occlusion of said downstream nozzle; an alternator driven by said power turbine; a frequency discriminator operatively associated with said alternator; a fluid pump driven by said power turbine; a control mechanism operable in response to fluid pressure delivered by said pump and cooperable with said valve; a bypass conduit about said control mechanism; and a normally open solenoid operated valve in said bypass conduit, said solenoid valve being connected to and responsive to a specific output frequency of said frequency discriminator, whereby to effect positioning of said control mechanism and associated delivery of reaction products either to said turbine or to atmosphere.

3. A tubine motor control system comprising, in combination: a power turbine; a source of propulsive fluid; first passage means for conducting reaction products from said propulsive fluid to a rotor of said power turbine; a pair of serially arranged flow restricting nozzles in said passage means, said nozzles being closely spaced with a relatively small volume area therebetween; heat shielding about said nozzles; a flow control valve positioned in said area and operatively associated with the furthest downstream of said nozzles; an atmospheric bleed conduit connected with said area, said valve being adapted also for cooperation with said bleed conduit; means for biasing said valve toward occlusion of said downstream nozzle; an alternator driven by said power turbine; a frequency discriminator operatively associated with said alternator; a fluid pump driven by said power turbine; a control mechanism operable in response to fluid pressure delivered by said pump and cooperable with said valve; a bypass conduit about said control mechanism; and a normally open solenoid operated valve in said bypass conduit, said solenoid valve being connected to and responsive to a specific output frequency of said frequency discriminator, whereby to effect positioning of said control mechanism and associated delivery of reaction products either to said turbine or to atmosphere.

4. A turbine motor and control therefor comprising, in combination: a bladed turbine rotor; an output shaft for said rotor; a plurality of alternators driven by said output shaft; a housing for said rotor and said shaft; a source of propulsive fluid; first passage means for conducting said propulsive fluid from said source to said housing for impingement upon said rotor; second passage means for conducting exhaust products from said rotor to atmosphere; a pair of serially arranged nozzles in said first passage means; a relatively small volume passageway between said nozzles and in said first passage means; means for controlling propulsive fluid flow through one of said nozzles; means responsive to changes in output frequencies of one of said alternators, above or below a predetermined level, for positioning said propulsive fluid flow controlling means; third passage means extending from said small volume passageway; and means connected with and responsive to operation of said propulsive fluid flow controlling means to bleed propulsive fluid reaction products from said passageway.

References Cited in the file of this patent

UNITED STATES PATENTS

| | | |
|---|---|---|
| 2,247,151 | Clarke | June 24, 1941 |
| 2,689,454 | Schneider | Sept. 21, 1954 |
| 2,695,365 | McLean | Nov. 23, 1954 |
| 2,723,528 | Stark et al. | Nov. 15, 1955 |